(12) United States Patent
Baluja et al.

(10) Patent No.: US 8,694,499 B1
(45) Date of Patent: Apr. 8, 2014

(54) SYSTEMS AND METHODS FOR DETERMINING QUERY SIMILARITY BY QUERY DISTRIBUTION COMPARISON

(75) Inventors: Shumeet Baluja, Mountain View, CA (US); Doug Beeferman, Palo Alto, CA (US); Andrew R Golding, Mountain View, CA (US)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 13/213,828

(22) Filed: Aug. 19, 2011

Related U.S. Application Data

(63) Continuation of application No. 10/952,482, filed on Sep. 29, 2004, now Pat. No. 8,024,337.

(51) Int. Cl.
*G06F 17/30* (2006.01)

(52) U.S. Cl.
CPC ............................ *G06F 17/30424* (2013.01)
USPC ........... 707/736; 707/706; 707/713; 707/758; 707/781; 704/7; 704/8; 702/182

(58) Field of Classification Search
USPC ................ 707/706, 713, 722, 736, 758, 781, 707/999.1–5, 7, 100, 102; 704/7, 8; 702/182
See application file for complete search history.

(56) References Cited

U.S. PATENT DOCUMENTS

| | | | |
|---|---|---|---|
| 5,864,845 A * | 1/1999 | Voorhees et al. | 1/1 |
| 6,230,154 B1 * | 5/2001 | Raz et al. | 707/740 |
| 6,321,189 B1 | 11/2001 | Masuichi et al. | |
| 6,349,276 B1 * | 2/2002 | McCarley | 704/8 |
| 6,484,162 B1 | 11/2002 | Edlund et al. | |
| 6,701,309 B1 | 3/2004 | Beeferman et al. | |
| 6,745,205 B2 | 6/2004 | Choi et al. | |
| 6,832,218 B1 | 12/2004 | Emens et al. | |
| 7,124,129 B2 | 10/2006 | Bowman et al. | |
| 2003/0144994 A1 * | 7/2003 | Wen et al. | 707/3 |
| 2004/0254920 A1 | 12/2004 | Brill et al. | |
| 2005/0192921 A1 | 9/2005 | Chaudhuri et al. | |
| 2006/0004850 A1 | 1/2006 | Chowdhury | |
| 2006/0212265 A1 | 9/2006 | Amitay et al. | |

OTHER PUBLICATIONS

Author: Beitel et al. Title: Hourly Analysis of a Very Large Topically Categorized Web Query Log Date: Jul. 25-29, 2004, Publisher: SIGIR'04 Pertinent pp. 8.*
Co-pending U.S. Appl. No. 10/952,482, filed Sep. 29, 2004, entitled "Systems and Methods for Determining Query Similarity by Query Distribution Comparison", by Baluka et al., 36 pages.
Beitzel et al., "Hourly Analysis of a very large topically categorized web query log", Jul. 25-29, 2004, ACM Edition: SIGIR'04, 8 pages.

* cited by examiner

*Primary Examiner* — Syling Yen
(74) *Attorney, Agent, or Firm* — Harrity & Harrity, LLP

(57) ABSTRACT

A system determines query similarity. The system determines a volume per unit time of an issued first query over a time period and determines a volume per unit time of issued other queries over the time period. The system compares the volume per unit time of each of the issued other queries to the volume per unit time of the issued first query. The system identifies ones of the issued other queries as similar to the first query based on the comparison.

30 Claims, 9 Drawing Sheets

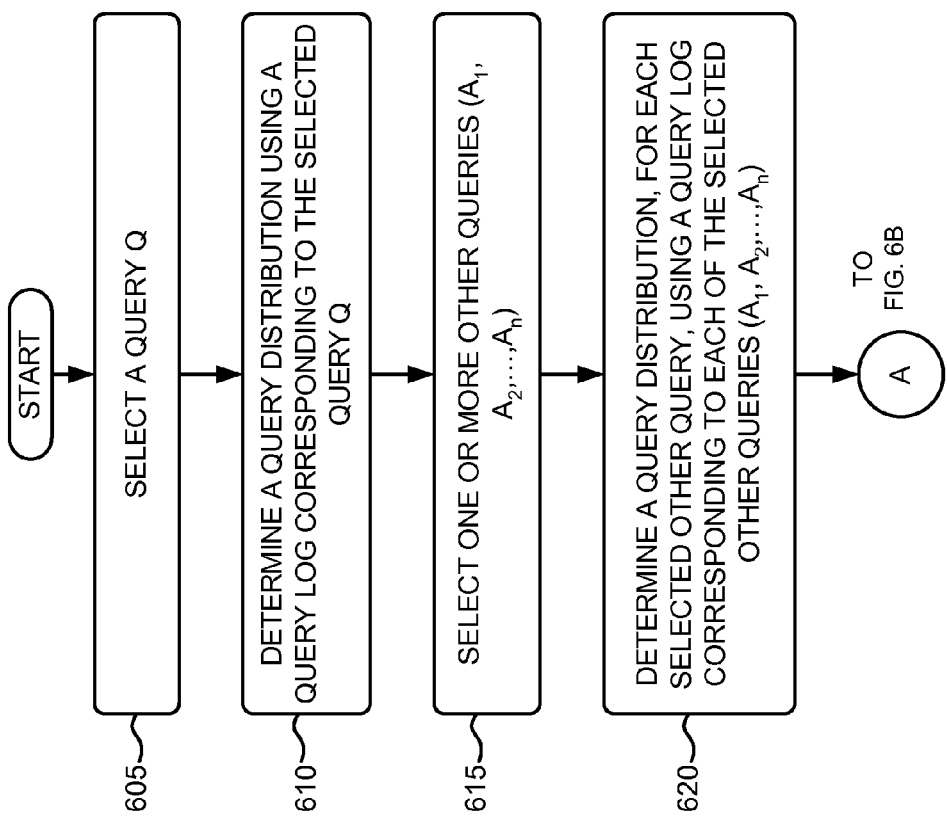

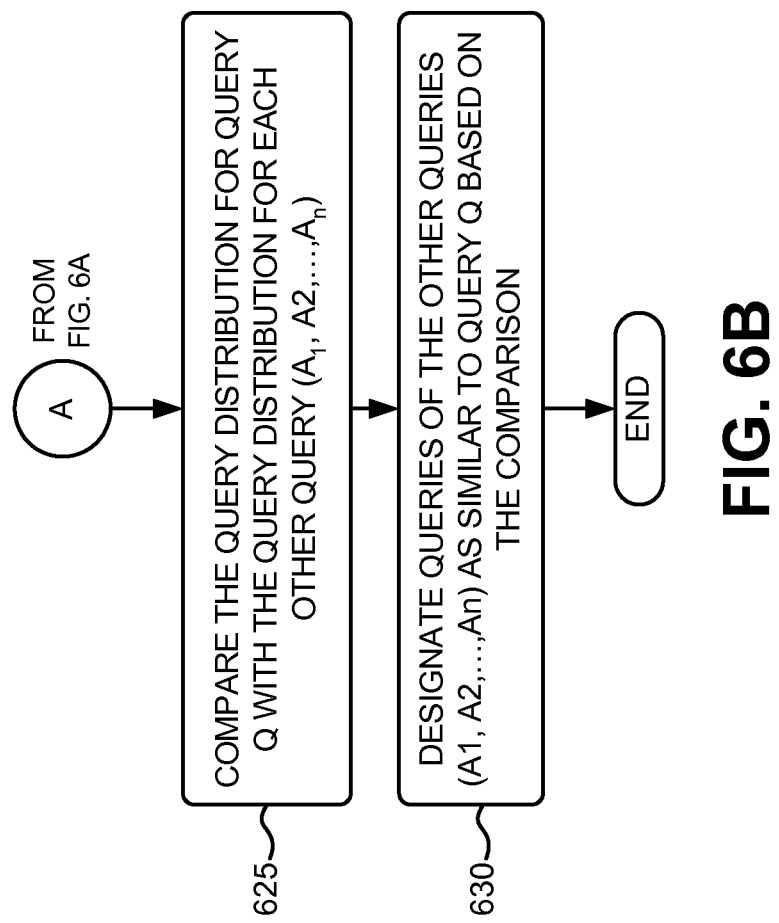

US 8,694,499 B1

SYSTEMS AND METHODS FOR DETERMINING QUERY SIMILARITY BY QUERY DISTRIBUTION COMPARISON

RELATED APPLICATION

This application is a continuation of co-pending U.S. patent application Ser. No. 10/952,482, filed on Sep. 29, 2004, entitled "SYSTEMS AND METHODS FOR DETERMINING QUERY SIMILARITY BY QUERY DISTRIBUTION COMPARISON," the disclosure of which is hereby incorporated by reference herein.

BACKGROUND

1. Field of the Invention

Systems and methods consistent with the principles of the invention relate generally to information searching and, more particularly, to determining the similarity of queries by comparing the query distributions of those queries.

2. Description of Related Art

Existing information searching systems use search queries to search through aggregated data to retrieve specific information that corresponds to the received search queries. Such information searching systems may search information stored locally, or in distributed locations. The World Wide Web ("web") is one example of information stored in distributed locations. The web contains a vast amount of information, but locating a desired portion of that information can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user.

Many users of a hypertext medium, such as the web, can read documents in more than one language. Consider, for example, a query in English from a user that can read English and Spanish. A conventional technique for identifying documents in Spanish for this English query involves translating the query to Spanish and then processing the translated query to identify matching Spanish documents.

Query terms are inherently ambiguous. Therefore, translating them is challenging. Some conventional approaches use a bilingual dictionary to perform query translations. It has been found, however, that using a bilingual dictionary results in noisy translations. The noisy translations may be due to many factors. For example, a translation may result in extraneous terms being added to the query because a dictionary entry may list several senses for a term. In other words, each term may have one or more possible translations in the dictionary. Also, general dictionaries often do not include technical terminology. This makes translation of technical query terms difficult.

Other conventional approaches rely either on "parallel corpora" (i.e., collections of documents in which each of the documents appears in two different languages) or "co-occurrence statistics" of terms in documents in the target language to which the query is being translated to translate query terms. A problem with the parallel corpora approach is that such corpora are rare and building them is prohibitively expensive.

SUMMARY OF THE INVENTION

According to one aspect consistent with the principles of the invention, a method of determining query similarity is provided. The method may include logging instances of an issued first query and logging instances of an issued second query. The method may further include determining a first query distribution using the logged instances of issued first queries and determining a second query distribution using the logged instances of issued second queries. The method may also include comparing the first and second query distributions and designating the second query as similar to the first query based on the comparison.

According to another aspect, a method of determining query similarity is provided. The method may include determining a volume per unit time of an issued first query over a time period and determining a volume per unit time of issued other queries over the time period. The method may further include comparing the volume per unit time of each of the issued other queries to the volume per unit time of the issued first query and identifying ones of the issued other queries as similar to the first query based on the comparison.

According to a further aspect, a data structure encoded on a computer-readable medium is provided. The data structure may include first data including a first query distribution corresponding to instances of issuance of a first query. The data structure may further include second data including second query distributions corresponding to instances of issuance of multiple other queries. The data structure may also include third data identifying matches between ones of the second query distributions and the first query distribution.

According to yet another aspect, a method of determining query similarity is provided. The method may include time stamping each issuance of a first query and storing the timestamp in a first query log and time stamping each issuance of a second query and storing the timestamp in a second query log. The method may include determining a first query distribution using the first query log, where the first query distribution includes a volume of issued first queries per unit time over a time period. The method may further include determining a second query distribution using the second query log, where the second query distribution includes a volume of issued second queries per unit time over the time period. The method may also include comparing the first and second query distributions by comparing the volume of issued first queries per unit of time with the volume of issued second queries per unit of time over the time period and designating the second query as similar to the first query based on the comparison.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 6A and 6B are flowcharts of an exemplary process for determining the similarity of queries through query distribution comparison according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link" as the term is used here, is to be broadly interpreted to include any reference to or from a document.

Exemplary Overview

Figure 1:
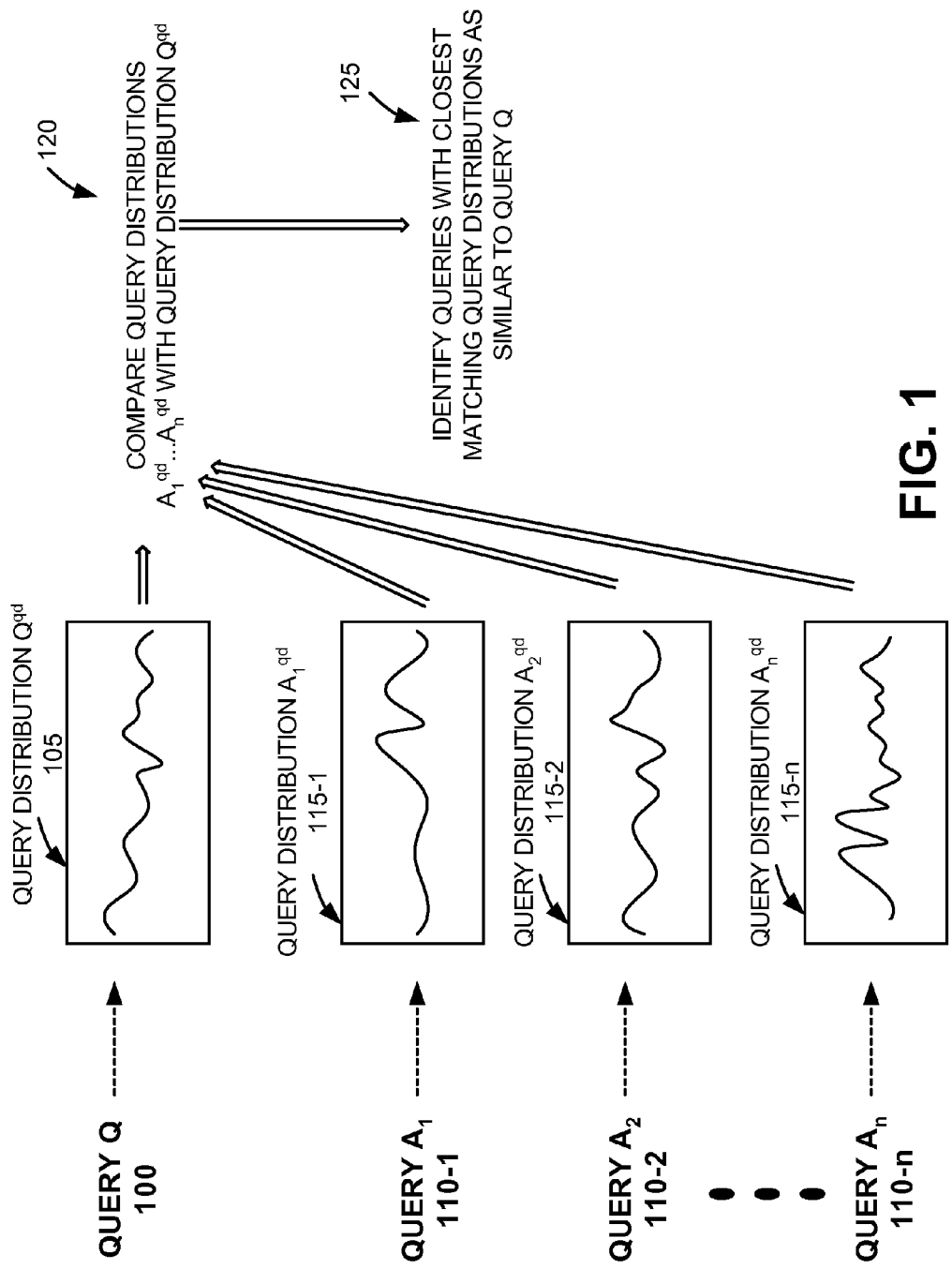
FIG. 1 is a diagram of an overview of an exemplary aspect of the invention.

FIG. 1 illustrates an overview of the determination of query similarity using query distributions according to an exemplary aspect of the invention. According to an aspect of the invention, other queries may be found that are similar to a given query by comparing query distributions associated with each of the queries. As shown in FIG. 1, a determination can be made whether queries $A_1$ 110-1, $A_2$ 110-2, ..., $A_n$ 110-$n$ are similar to a given query Q 100. A query distribution $Q^{qd}$ 105 may be associated with query Q 100. Query distributions $A_1^{qd}$ 115-1 through $A_n^{qd}$ 115-$n$ may each be associated with a respective query of queries $A_1$ 110-1 through $A_n$ 110-$n$. Each query distribution may be derived from a log of corresponding issued queries over a time interval of $t_1$ to $t_n$. For example, each instance of a query, such as "Tour de France," being issued by a client 210 may be logged in a query log. A query distribution that plots, for example, the daily volume of each issuance of the query "Tour de France" over the time interval $t_1$ to $t_n$ may then be derived from the query log.

Each of the query distributions $A_1^{qd}$ 115-1 through $A_n^{qd}$ 115-$n$ may be compared 120 with query distribution $Q^{qd}$ 105. In one implementation, the comparison may determine the distance between query distribution $Q^{qd}$ 105 and each of the query distributions $A_1^{qd}$ 115-1 through $A_n^{qd}$ 115-$n$. Queries, associated with query distributions $A_1^{qd}$ 115-1 through $A_n^{qd}$ 115-$n$, that match query distribution $Q^{qd}$ 105 the closest can be identified 125 as similar to query Q. In one implementation, those query distributions of query distributions $A_1^{qd}$ 115-1 through $A_n^{qd}$ 115-$n$ that are determined to have the closest distance to query distribution $Q^{qd}$ 105 may be considered as matching, and the associated queries designated as similar to query Q.

Exemplary Network Configuration

Figure 2:
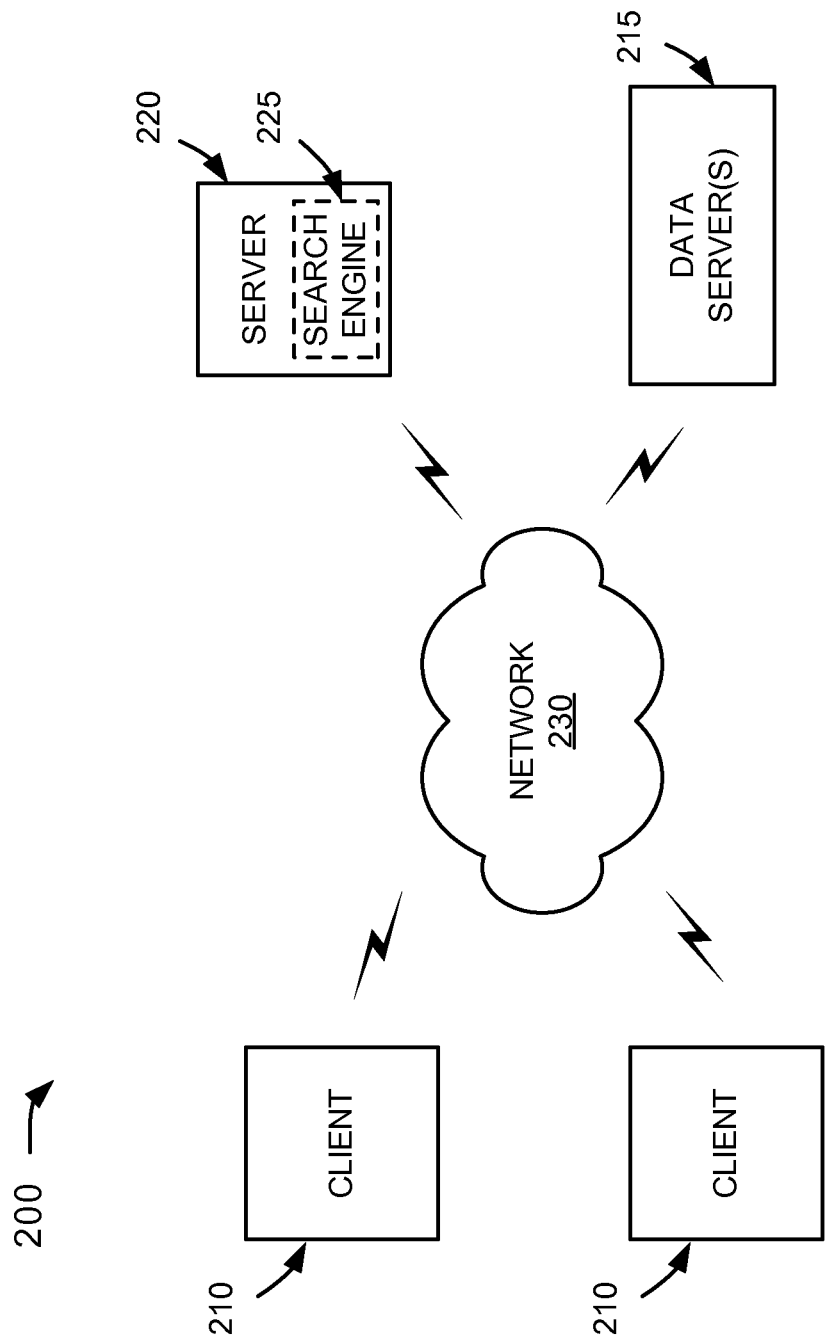
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 215 via a network 230. Network 230 may include a local area network (LAN), a wide area network (WAN), a telephone network, such as the Public Switched Telephone Network (PSTN), an intranet, the Internet, a memory device, another type of network, or a combination of networks. Two clients 210 and two servers 220 and 215 have been illustrated as connected to network 230 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 215 may include server entities that gather, process, search, and/or maintain documents in a manner consistent with the principles of the invention. Clients 210 and servers 220 and 215 may connect to network 230 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on data server(s) 215 and store information associated with these documents in a repository of crawled documents. The data aggregation service may be implemented in other ways, such as by agreement with the operator(s) of data server(s) 215 to distribute their hosted documents via the data aggregation service. Search engine 225 may execute a query, received from a user, on the corpus of documents hosted on data server(s) 215.

Server(s) 215 may store or maintain documents that may be crawled by server 220. Such documents may include data related to published news stories, products, images, user groups, geographic areas, or any other type of data. For example, server(s) 215 may store or maintain news stories from any type of news source, such as, for example, the Washington Post, the New York Times, Time magazine, or Newsweek. As another example, server(s) 215 may store or maintain data related to specific product data, such as product data provided by one or more product manufacturers. As yet another example, server(s) 215 may store or maintain data related to other types of web documents, such as pages of web sites.

While servers 220 and 215 are shown as separate entities, it may be possible for one or more of servers 220 and 215 to perform one or more of the functions of another one or more of servers 220 and 215. For example, it may be possible that two or more of servers 220 and 215 are implemented as a single server. It may also be possible for a single one of servers 220 or 215 to be implemented as two or more separate (and possibly distributed) devices.

Exemplary Client/Server Architecture

Figure 3:
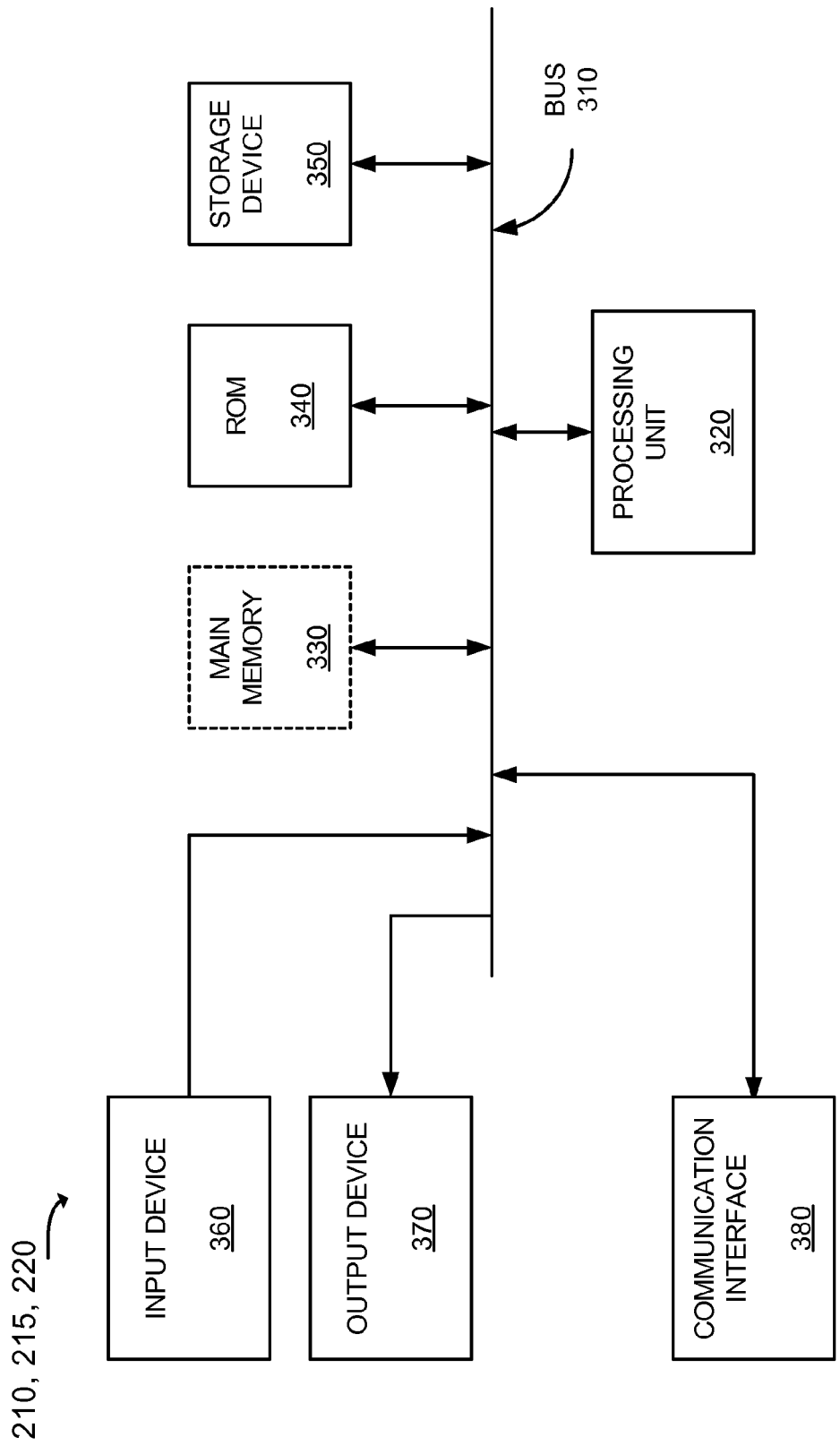
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 215, according to an implementation consistent with the principles of the invention. The client/server entity may include a bus 310, a processing unit 320, an optional main memory 330, a read only memory (ROM) 340, a storage device 350, an input device 360, an output device 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or other biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain searching-related operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Query Logs

Figure 4:
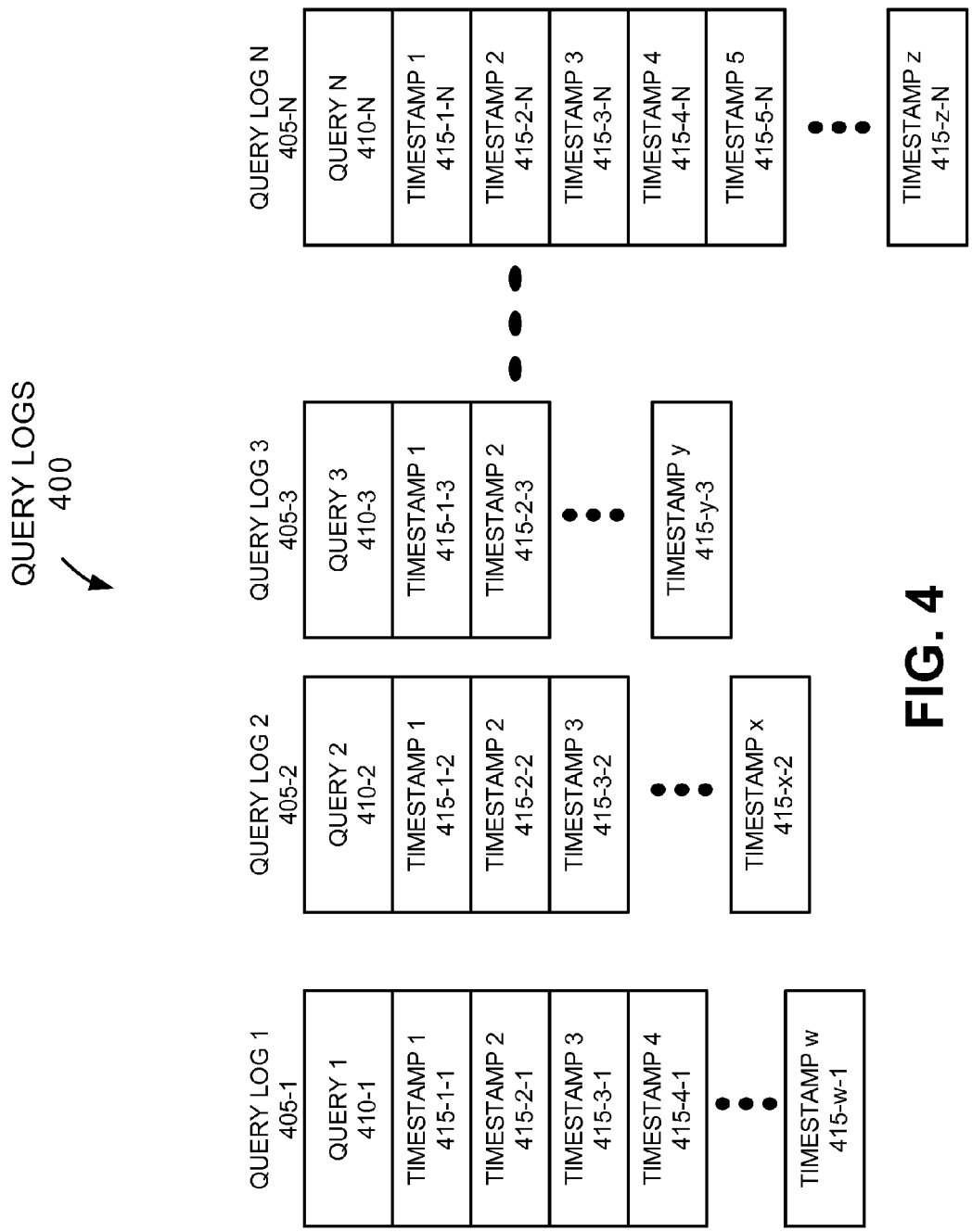
FIG. 4 is a diagram of exemplary query logs consistent with principles of the invention.

FIG. 4 is a diagram illustrating exemplary query logs 400 consistent with principles of the invention. Query logs 400 may be stored in main memory 330, ROM 340, and/or storage device 350 of server 220. Query logs 400 may include multiple query logs 405-1 through 405-N. Each query log 405 may include an identified query 410 and multiple time stamps 415. Query 410 identifies the query that is associated with a respective query log. For example, query 410 may identify the query "Tour de France" or "Summer Olympics." Each timestamp 415 may include a time at which a query identified by query 410 was issued. Thus, each time a query is issued (e.g., by a client 210 to server 220) a timestamp 415 may be stored in a corresponding query log 405.

As shown in FIG. 4, query log 1 405-1 may include a query 1 410-1, and multiple timestamps 415-1-1 through 415-w-1 indicating each time that query 1 was issued. Query log 2 405-2 may include a query 2 410-2, and multiple timestamps 415-1-2 through 415-x-2 indicating each time that query 2 was issued. Query log 3 405-3 may include a query 3 410-3, and multiple timestamps 415-1-3 through 415-y-3 indicating each time that query 3 was issued. Query log N 405-N may include a query N 410-N, and multiple timestamps 415-1-N through 415-z-N indicating each time that query N was issued.

Exemplary Query Logging Process

Figure 5:
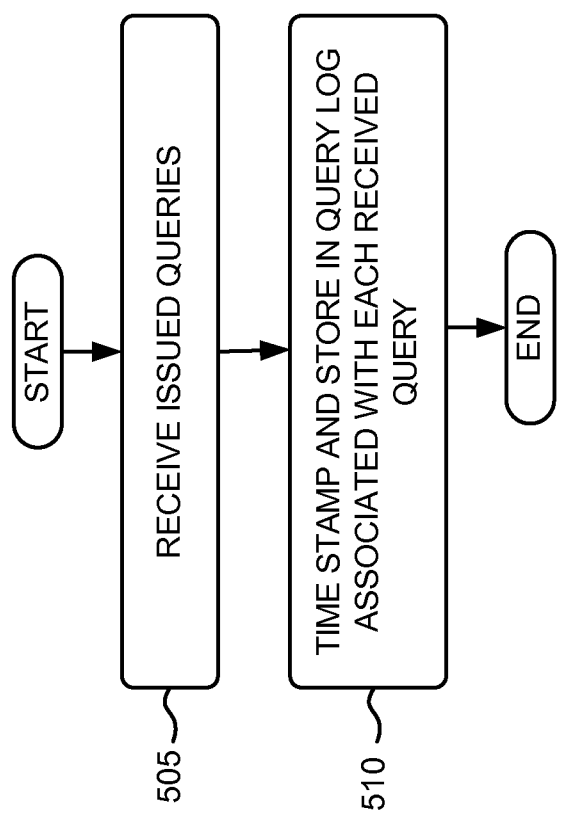
FIG. 5 is a flowchart of an exemplary process for logging issued queries consistent with principles of the invention.

FIG. 5 is a flowchart of an exemplary process for logging queries received at a server according to an implementation consistent with the principles of the invention. As one skilled in the art will appreciate, the processing exemplified by FIG. 5 can be implemented in software and stored on a computer-readable memory, such as main memory 330, ROM 340 or storage device 350 of server 220. In other implementations, the processing exemplified by FIG. 5 can be implemented in hardwired circuitry, such as combinational logic, within processing unit 320 of server 220.

Processing may begin with the receipt of issued queries at server 220 (act 505). Server 220 may receive the issued queries from clients 210 via network 230. The issued queries may relate to searching through any type of aggregated documents. In one implementation, each of the queries may be associated with searching a particular type or category of documents. For example, a given query may relate to searching through documents containing news content. As another example, a given query may relate to searching through documents containing product content. Each received query may be time stamped and the time stamp stored in an associated query log 405 (act 510). Referring to FIG. 4, a time stamp associated with a query "Query Z" may be inserted in a timestamp entry 415 of the query log 405 that has a matching query identifier 410.

Exemplary Query Similarity Determination Process

FIGS. 6A and 6B are flowcharts of an exemplary process for determining query similarity using query distributions according to an implementation consistent with the principles of the invention. As one skilled in the art will appreciate, the processing exemplified by FIGS. 6A and 6B can be implemented in software and stored on a computer-readable memory, such as main memory 330, ROM 340 or storage device 350 of server 220. In other implementations, the processing exemplified by FIGS. 6A and 6B can be implemented in hardwired circuitry, such as combinational logic, within processing unit 320 of server 220.

Processing may begin with the selection of a query Q (act 605)(FIG. 6A). Query Q may be selected based on, for example, a request from a client 210 to determine other queries similar to query Q. A query distribution for query Q may then be determined using a query log corresponding to the selected query Q (act 610). Query log 400 may be consulted to retrieve timestamps from a query log 405 whose query identifier 410 matches the selected query Q. The timestamps may be used to derive a query distribution that indicates query volumes over a given period of time. In one implementation, a query distribution that includes daily query volumes over the given period of time may be derived. In other implementations, the period of time may include an hour, a week, etc.

One or more other queries $(A_1, A_2, \ldots, A_n)$ may be selected (act 615). The one or more other queries may be selected from queries in a same language as query Q, or in a different language than query Q. In one implementation, the one or more other queries $(A_1, A_2, \ldots, A_n)$ may be selected from a target language of interest that is different than the language of query Q. The target language of interest may be determined from a particular server that handles a region's (e.g., specific countries) queries, from reverse IP lookups to determine the countries of origin of specific queries, or by noting the language version of the search engine interface (e.g., Google.de or Google.jp) from which the query was issued.

Figure 7:
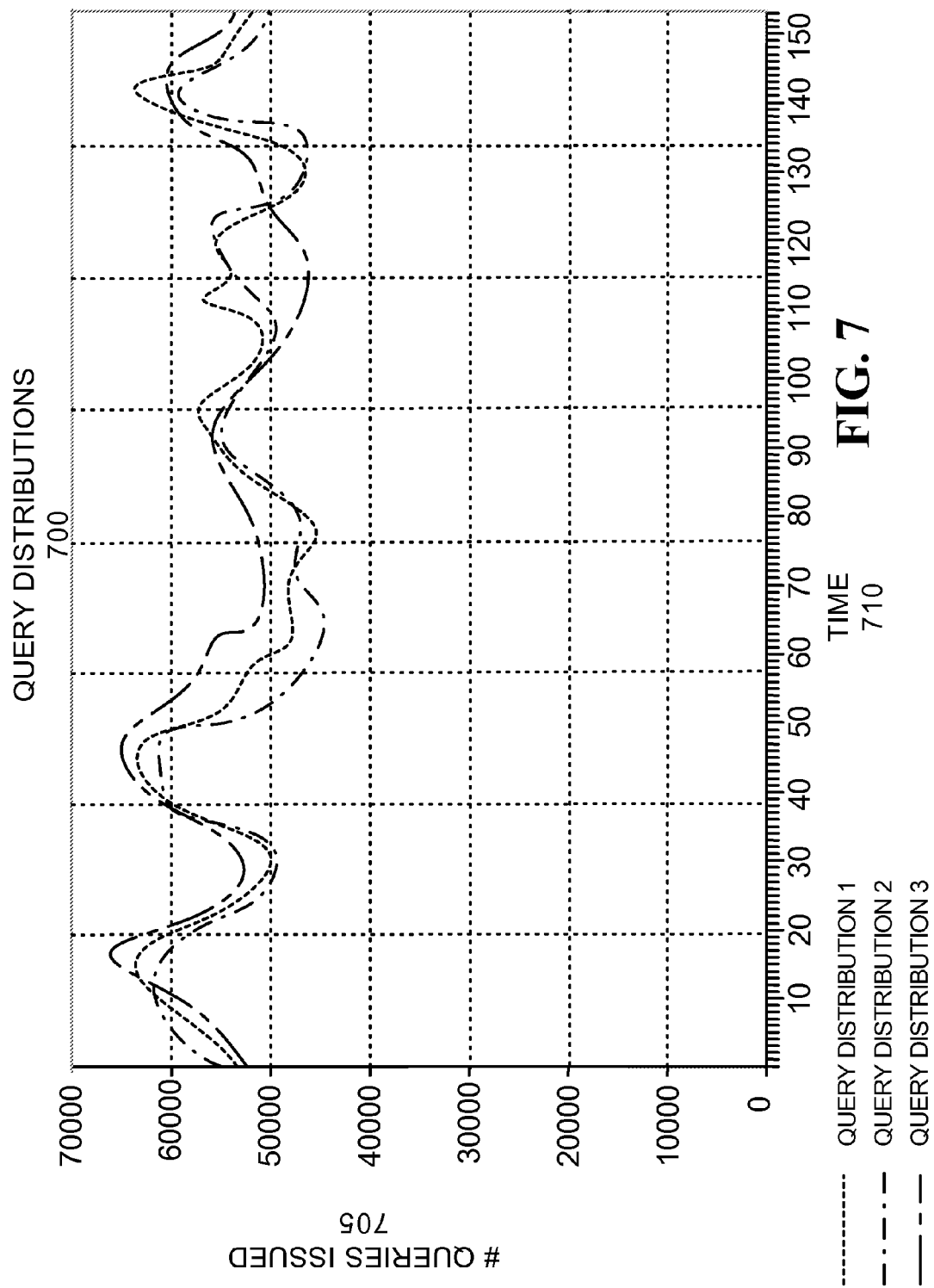
FIG. 7 is a diagram of exemplary plotted query distributions according to an implementation consistent with principles of the invention.

A query distribution, for each selected other query, may be determined using a query log corresponding to each of the selected other queries $(A_1, A_2, \ldots, A_n)$ (act 620). For each query $(A_1, A_2, \ldots, A_n)$, query log 400 may be consulted to retrieve timestamps from a query log 405 whose query identifier 410 matches a respective query $(A_1, A_2, \ldots, A_n)$. The timestamps may be used to derive a query distribution for each query $(A_1, A_2, \ldots, A_n)$ that indicates query volumes per unit time over a given period of time. In one implementation, a query distribution that includes daily query volumes over the given period of time may be derived. FIG. 7 illustrates query distributions 700 of one exemplary aspect of the invention. Each of the query distributions (query distribution 1, query distribution 2, query distribution 3) is plotted as a number of queries issued 705 over a time axis 710. As shown in FIG. 7, the time axis 710 may include daily volumes. Thus, as shown in FIG. 7, the plot of each query distribution depicts a number of queries issued for each day over a time period spanning approximately 150 days.

The query distribution for query Q may be compared with the query distributions for each of the other queries $(A_1, A_2, \ldots, A_n)$ (act 625)(FIG. 6B). In one implementation, a daily volume over a time period $t_1$ to $t_n$ for query Q may be compared to corresponding daily volumes for each query $(A_1, A_2, \ldots, A_n)$. In other implementations, the comparison can be made on an hour basis, a daily basis, a weekly basis, etc. During comparison, a "distance" measure between the query distribution for query Q and each of the query distributions for queries $(A_1, A_2, \ldots, A_n)$ can be determined. The "distance" measure may be calculated in a number of ways. Information theoretic measures such as, for example, KL-Divergence, may be used to calculate the distance measures. In other implementations, Euclidean distance, L{1, 2, 3, inf} Norm, and smoothing of the time series (i.e., removing high-frequency noise) may be used in calculating the distance measures.

Queries of the other queries $(A_1, A_2, \ldots, A_n)$ may then be designated as similar to query Q based on the comparison (act 630). Those queries of queries $(A_1, A_2, \ldots, A_n)$ that have query distributions that closely match the query distribution of query Q may be designated as similar to query Q. In one implementation, the queries of queries $(A_1, A_2, \ldots, A_n)$ that have the smallest "distance" measure (i.e., below a pre-set threshold) from query Q may be designated as similar to query Q.

In one implementation consistent with principles of the invention, the comparison (e.g., act 625) may include measuring how variable (or how much entropy) query Q has over time. If a query of queries $(A_1, A_2, \ldots, A_n)$ matches and query Q has high entropy, then the likelihood of a real match is greater (i.e., if the query distribution for Q is "flat," then there may be many other queries that also have flat distributions).

In another implementation, the comparison may include weighting of the matching to the period of highest variability. For example, for a movie release, on the day of the release there may be a sharp increase in issued queries. The comparison may determine if there is a corresponding sharp increase in the matching queries. In a further implementation, the comparison may include weighting of the matching to the periods of highest volume. Matching during periods of low volume may, perhaps, be based on insufficient information (i.e., the volume is so low that a few queries may be enough to distort the results) and, thus, weighting the matching to periods of highest volume reduces this problem.

In another implementation, the comparison may include matching to periods of highest information gain. Thus, portions of the curve for query Q that are the most different from other queries (i.e., the portions of the curve for query Q that make the curve unique) in the same language may be used for matching. In yet further implementations, other measures, other than search volume, may be used in the comparison of queries. For example, rank, change in rank over time, change in volume over time, acceleration in volume over time, and acceleration in rank over time may be used in comparing queries. Additionally, scaled search volume traffic (e.g., scaled by total volume for that day) may be used in comparing queries.

Exemplary Implementation

Figure 8:
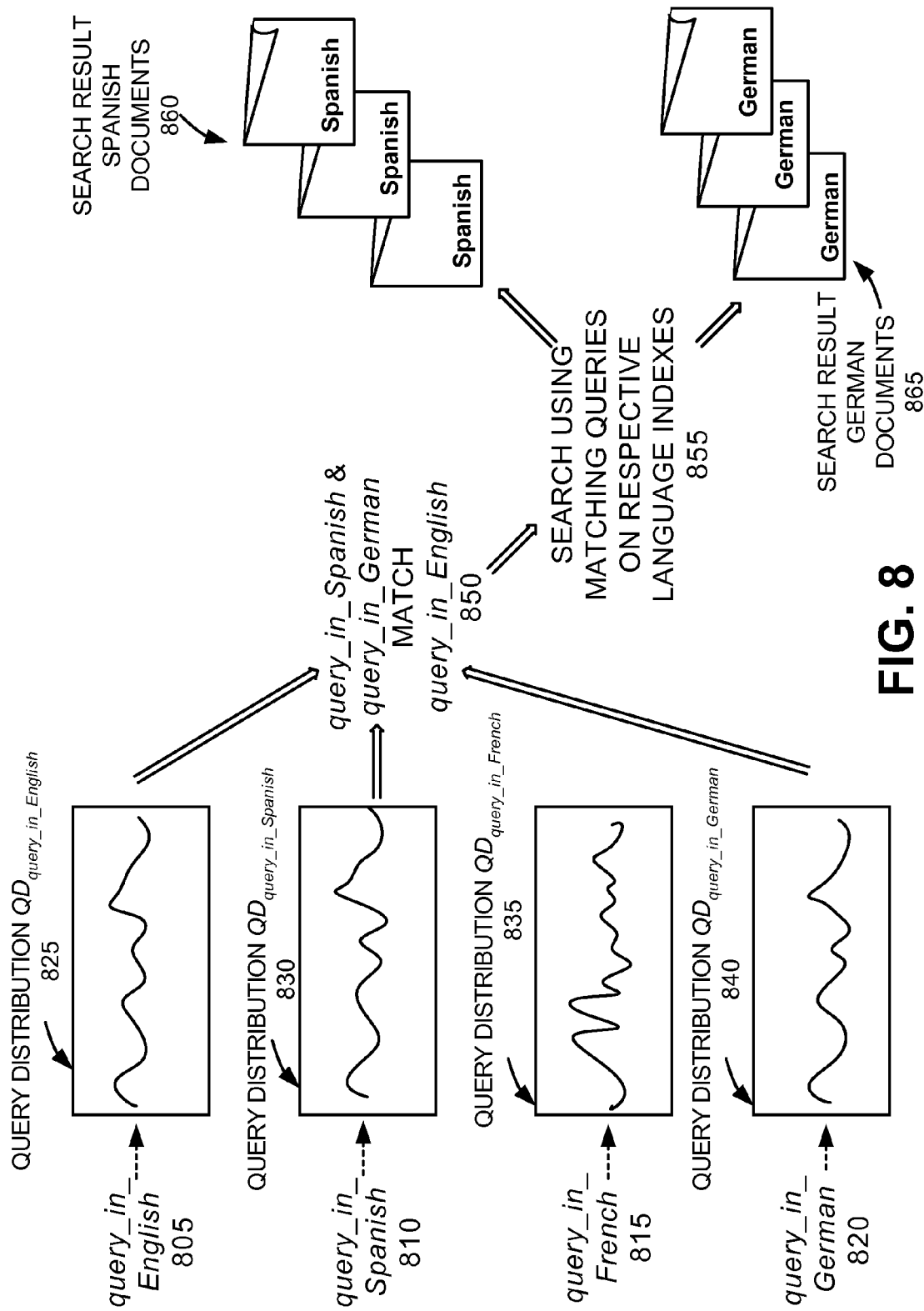
FIG. 8 is a diagram of an overview of an exemplary aspect of the invention that identifies similar cross-language queries through query distribution comparison.

FIG. 8 illustrates an exemplary implementation in which query distribution comparison is used to find similar queries in different languages. As shown in FIG. 8, a determination can be made whether queries in different languages are similar to a query in a first language. For example, FIG. 8 depicts a query in English (query_in_English) 805 that is being compared with a query in Spanish (query_in_Spanish) 810, a query in French (query_in_French) 815 and a query in German (query_in_German) 820. A query distribution $QD_{query\_in\_English}$ 825 may be associated with query query_in_English 805. A query distribution $QD_{query\_in\_Spanish}$ 830 may be associated with query query_in_Spanish 810. A query distribution $QD_{query\_in\_French}$ 835 may be associated with query query_in_French 815. A query distribution $QD_{query\_in\_German}$ 840 may be associated with query query_in_German 820.

As described above with respect to FIGS. 6A and 6B, query distribution $QD_{query\_in\_English}$ 825 may be compared with each of query distributions $QD_{query\_in\_Spanish}$ 830, $QD_{query\_in\_French}$ 835, and $QD_{query\_in\_German}$ 840. In the exemplary implementation of FIG. 8, each of query distributions $QD_{query\_in\_Spanish}$ 830 and $QD_{query\_in\_German}$ 840 is found to match 850 $QD_{query\_in\_English}$ 825. The queries query_in_Spanish 810 and query_in_German 820, thus, can be considered to be similar to query query_in_English 805 and, therefore, can be used to search through Spanish and German documents.

A search 855 may then be performed, using the queries query_in_Spanish 810 and query_in_German 820 corresponding to the matching query distributions, on respective language indexes. For example, the query query_in_Spanish 810 may be used to search a Spanish language index and the query query_in_German 820 may be used to search a German language index. As a result of the searches of the respective language indexes, documents 860 in Spanish and documents 865 in German may be returned. The documents 860 in Spanish, and the documents 865 in German, may then be translated, if desired, to English using existing techniques.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5, 6A and 6B, the order of the acts may be modified in other implementations consistent with the principles of the invention. Also, non-dependent acts may be performed in parallel.

In some implementations, time normalization of the query distributions may be used to normalize the difference in timezones and/or the potentially varying speeds by which information reaches different countries. Time normalization of the query distributions can be implemented using techniques drawn from speech-recognition, in which utterances are time-synchronized with stored utterances to be compared. Techniques such as Viterbi may also be used in time normalization.

In further implementations, "time shifting" may be used to compare different query distributions that may not be compared over a same interval of time. For example, a first query distribution may occur over a first interval of time and a second query distribution may occur over a second interval of time. Each of the query distributions may be "time shifted" by comparing the distributions, for example, based on a leading upward edge of the respective query distributions. As an illustrative example, a similar query distribution may be observed whenever a new movie is released. Therefore, each query distribution may be monitored to see if it matches this characteristic shape, to infer that the query distribution may be a query distribution related to a new movie release, and to predict any remaining unseen part of the query distribution. Because new movie releases may not occur at the same time, "time shifting" permits comparison of the respective query distributions over different time intervals.

In additional implementations, dictionaries may be used to augment and/or refine query distribution comparison. It is possible that many queries may have the same distributions over time, and that only a fraction of these queries may be related. In order to refine the matching, a standard dictionary (e.g., in the case of cross-language comparison, a language-A to language-B dictionary) may be used to augment and/or refine the matching process. Use of these dictionaries may assist in eliminating false positive matches.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein. Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
    determining, by the server device, a distance measure between a first query distribution, which measures a volume of searches performed using a first query over a period of time, and a second query distribution, which measures a volume of searches performed using a second query over the period of time;
    comparing, by the server device, the distance measure between the first query distribution and the second query distribution to a specified threshold to determine that the distance measure between the first query distribution and the second query distribution is below the specified threshold;
    designating, by the server device, the second query as similar to the first query based on the distance measure being below the specified threshold; and
    storing, by the server device, information indicating that the second query is similar to the first query based on the distance measure being below the specified threshold.

2. The method of claim 1, where the first query is in a first language, and
    where the second query is in a second language that is different than the first language.

3. The method of claim 1, where the period of time includes a predetermined amount of time in days, hours, or weeks.

4. The method of claim 1, where the distance measure includes a Euclidean distance measure.

5. The method of claim 1, where determining the distance measure includes:
    smoothing at least one of the first query distribution or the second query distribution to remove noise.

6. The method of claim 1, where determining the distance measure includes:
    weighting at least one of the first query distribution or the second query distribution to give more weight to a first time interval associated with a higher variability than a second time interval.

7. The method of claim 1, where determining the distance measure includes:
    weighting at least one of the first query distribution or the second query distribution to give more weight to a first time interval associated with a higher volume of searches than a second time interval.

8. The method of claim 1, where determining the distance measure includes:
    weighting at least one of the first query distribution or the second query distribution to give more weight to a first time interval associated with a higher entropy than a second time interval.

9. The method of claim 1, where determining the distance measure includes:
    determining a rank of the first query;
    determining a rank of the second query; and
    comparing the rank of the first query to the rank of the second query.

10. The method of claim 1, where determining the distance measure includes:
    comparing a change in a rank of the first query over time to a change in a rank of the second query over time.

11. The method of claim 1, where determining the distance measure includes:
    comparing an acceleration in volume of searches using the first query over time to an acceleration in volume of searches using the second query over time.

12. A method performed by a server device, the method comprising:
 receiving, by the server device, a first query;
 determining, by the server device, that a second query is similar to the first query based on a distance measure between a first query distribution, associated with the first query, and a second query distribution, associated with the second query, being less than a threshold distance measure,
  the first query distribution measuring a volume of searches performed using the first query over a period of time, and
  the second query distribution measuring a volume of searches performed using the second query over the period of time; and
 providing search results, associated with the second query, as a response to the first query, based on identifying the second query as similar to the first query.

13. The method of claim 12, further comprising:
 measuring how variable the first query is over the period of time; and
 where determining that the second query is similar to the first query includes:
  determining that the second query is similar to the first query further based on how variable the second query is over the period of time.

14. The method of claim 12, where the first query distribution measures a change in the volume of searches using the first query over the period of time, and
 where the second query distribution measures the change in volume of searches using the second query over the period of time.

15. The method of claim 12, where the first query is in a first language, and
 where the second query is in a second language that is different than the first language.

16. The method of claim 12, where the first query distribution measures a rank of the first query over the period of time, and
 where the second query distribution measures a rank of the second query over the period of time.

17. The method of claim 12, where the first query distribution measures a change in rank of the first query over the period of time, and
 where the second query distribution measures a change in rank of the second query over the period of time.

18. A system comprising:
 one or more server devices, implemented at least partially in hardware, to:
  determine a distance measure between a first query distribution, which measures a volume of searches using a first query over a period of time and a second query distribution, which measures a volume of searches using a second query over the period of time;
  compare the distance measure to a specified threshold to determine that the distance measure between the first query distribution and the second query distribution is below the specified threshold; and
  designate the second query as similar to the first query based on the distance measure being below the specified threshold.

19. The system of claim 18, where the first query is in a first language, and
 where the second query is in a second language that is different than the first language.

20. The system of claim 18, where, when determining the distance measure, at least one of the one or more server devices is to:
 smooth at least one of the first query distribution or the second query distribution to remove noise.

21. The system of claim 18, where, when determining the distance measure, at least one of the one or more server devices is to:
 weight at least one of the first query distribution or the second query distribution to give more weight to a first time interval associated with a higher variability than a second time interval.

22. The system of claim 18, where, when determining the distance measure, at least one of the one or more server devices is to:
 weight at least one of the first query distribution or the second query distribution to give more weight to a time interval associated with a higher volume of searches than another time interval.

23. The system of claim 18, where, when determining the distance measure, at least one of the one or more server devices is to:
 weight at least one of the first query distribution or the second query distribution to give more weight to a first time interval associated with a higher entropy than a second time interval.

24. The system of claim 18, where, when determining the distance measure, at least one of the one or more server devices is to:
 compare a rank of the first search query to a rank of the second query.

25. A system comprising:
 one or more server devices, implemented at least partially in hardware, to:
  receive a first query;
  identify a second query as being similar to the first query, based on a distance measure between a first query distribution, associated with the first query, and a second query distribution, associated with the second query, being less than a threshold distance measure,
   the first query distribution measuring a volume of searches performed using the first query over a period of time, and
   the second query distribution measuring a volume of searches performed using the second query over the period of time; and
  provide search results, associated with the second query, as a response to the first query, based on identifying the second query as being similar to the first query.

26. The system of claim 25, where the one or more server devices are further to:
 measure a variability of the first query over the period of time; and
 where, when identifying the second query as being similar to the first query, the one or more server devices are to:
  identify the second query as being similar to the first query further based on the variability of the first query over the period of time.

27. The system of claim 25, where the first query distribution measures a change in volume of the first query over the period of time, and
 where the second query distribution measures a change in volume of the second query over the period of time.

28. The system of claim 25, where the first query is in a first language, and
 where the second query is in a second language that is different than the first language.

29. The system of claim 25, where the first query distribution measures a rank of the first query over the period of time, and
 where the second query distribution measures a rank of the second query over the period of time.

30. The system of claim 25, where the first query distribution measures a change in rank of the first query over the period of time, and
 where the second query distribution measures a change in rank of the second query over the period of time.

* * * * *